United States Patent
Rao et al.

(10) Patent No.: US 11,956,123 B1
(45) Date of Patent: Apr. 9, 2024

(54) MONITORING INTERFACE CONFIGURATIONS FOR NETWORK DEVICES IN FABRICS

(71) Applicant: Cisco Technology, Inc., San Jose, CA (US)

(72) Inventors: Patnala Debashis Rao, Cupertino, CA (US); Shyam Kapadia, San Jose, CA (US); Jason David Notari, Pleasanton, CA (US); Lukas Krattiger, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 17/489,351

(22) Filed: Sep. 29, 2021

(51) Int. Cl.
*H04W 40/24* (2009.01)
*H04L 41/0873* (2022.01)

(52) U.S. Cl.
CPC .............. *H04L 41/0873* (2013.01)

(58) Field of Classification Search
CPC .................... H04W 40/24; H04W 74/002
See application file for complete search history.

(56) References Cited

U.S. PATENT DOCUMENTS

| | | | | |
|---|---|---|---|---|
| 5,970,064 | A * | 10/1999 | Clark | H04L 41/0894 370/242 |
| 7,328,287 | B1 * | 2/2008 | Arumugham | G06F 3/067 710/33 |
| 8,429,255 | B1 * | 4/2013 | Khan | H04L 47/10 709/221 |
| 10,278,112 | B1 * | 4/2019 | A | H04L 41/0866 |
| 10,382,265 | B1 * | 8/2019 | Anburose | H04L 61/5076 |
| 2008/0178256 | A1 * | 7/2008 | Perrone | G06F 9/468 715/764 |
| 2011/0172830 | A1 * | 7/2011 | Milder | F24D 19/1009 700/277 |
| 2014/0380425 | A1 * | 12/2014 | Lockett | G06F 21/00 726/4 |
| 2015/0067113 | A1 * | 3/2015 | Dankwardt | H04L 41/0816 709/221 |
| 2017/0339109 | A1 * | 11/2017 | Zeng | G05B 19/418 |

(Continued)

OTHER PUBLICATIONS

FortiNAC Administration Guide version 8.7.0 published by Fortinet on Jul. 29, 2019 884 pages.

(Continued)

*Primary Examiner* — Zhiren Qin
(74) *Attorney, Agent, or Firm* — Lee & Hayes P.C.

(57) ABSTRACT

Techniques for determining that a configuration change in configurations for a network device has occurred to result in changed configurations for the network device. The techniques include creating a policy for the network device by a network controller that manages one or more network devices. The network controller may obtain data from the network device, and update the network device policy based on the obtained data. In some examples, the network controller may compare the network device configurations state with the network controller intent to determine if an Out-of-Band (OOB) configuration change has occurred in the configuration of the network device. Finally, the controller may synchronize the network device to the controller based on the updated policy.

20 Claims, 6 Drawing Sheets

(56) References Cited

U.S. PATENT DOCUMENTS

2018/0062926 A1\*  3/2018  Kaplan ............... H04L 41/0869
2019/0356971 A1   11/2019  Herdrich et al.
2020/0067733 A1\*  2/2020  Hira ................... H04L 12/4633
2020/0274766 A1   8/2020  Notari et al.
2021/0028980 A1   1/2021  R et al.

OTHER PUBLICATIONS

Junso Space Network Director User Guide release 3.7 published Nov. 10, 2020 published by Juniper Networks, Inc. Sunnyvale, CA 94089 1528 pages.

\* cited by examiner

MONITORING INTERFACE CONFIGURATIONS FOR NETWORK DEVICES IN FABRICS

TECHNICAL FIELD

The present disclosure relates generally to techniques for intelligent network deployments. More specifically, it is directed to extending an automated centric approach for fabric management in brownfield deployments.

BACKGROUND

Greenfield and brownfield deployments are the two main strategies that have been used for network deployments by network service providers. In greenfield deployment, configuration and installation of a network may not exist before. The greenfield strategy may take place in a new installation that can be custom designed for new technology. In contrast, a brownfield deployment may use the existing network infrastructure, and may provide an upgrade or addition to the network. In some cases, when an expansion may take place within an existing network, a mix of both greenfield and brownfield deployment strategies may be used. While users may experience network performance, the implementation strategies for greenfield and brownfield can be vastly different.

The vast majority of network deployment model are predominantly brownfield. A brownfield deployment requires that any new infrastructure may co-exist with incumbent equipment and systems. In a brownfield environment, the existing manufacturing weakness and areas for improvement are well established over a long period of time. For instance, prior maintenance, operational and configuration data for network devices is readily available for parsing. Thus, the brownfield deployment may be more efficient to deploy and maintain, and may require less effort to configure and optimize the network devices than the greenfield field deployment.

A switched fabric or fabric is a combination of individual network devices that connects different network nodes. The switched fabric are consistently configured to support the development and deployment of new configuration in the presence of existing configurations (e.g., Brownfield deployment). In most customer deployment models, a Command Line Interface (CLI) has been used for configuring the fabric devices in a network. Additionally, most automation tools which provide configuration management and automation models, may eventually translated to into CLI configuration directly or indirectly. While customers may employ controller devices for configuring switched fabric, the network administrators may still want to the ability to configure the fabric directly without going through the controller. For instance, in some scenarios such as network troubleshooting, when there is small maintenance window, rapid escalation, or bulk device provisioning, the network administrators may want to configure the fabric directly.

Various challenges arise when deploying these network topologies. For instance, the fabric configuration changes may be made Out-Of-Band (OOB), when accessing a network device via CLI. The OOB changes may be made to fix critical issues during troubleshooting or deploying the network. As such, it may be possible that the controller configuration state be different than the configuration state of the fabric. When such deviation is detected, a controller may report an Out-of-Sync status. Accordingly, the controller may undo the prior OOB changes to sync the controller to the fabric. Such OOB changes may affect controller ability to detect to configuration changes, and to fix them.

Thus, in order to improve the fabric efficiency, there is a need for a mechanism to detect OOB configuration changes in the fabric, and sync up the fabric to the controller device. Such mechanism may improve the overall network performance and user experience by improving the fabric performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
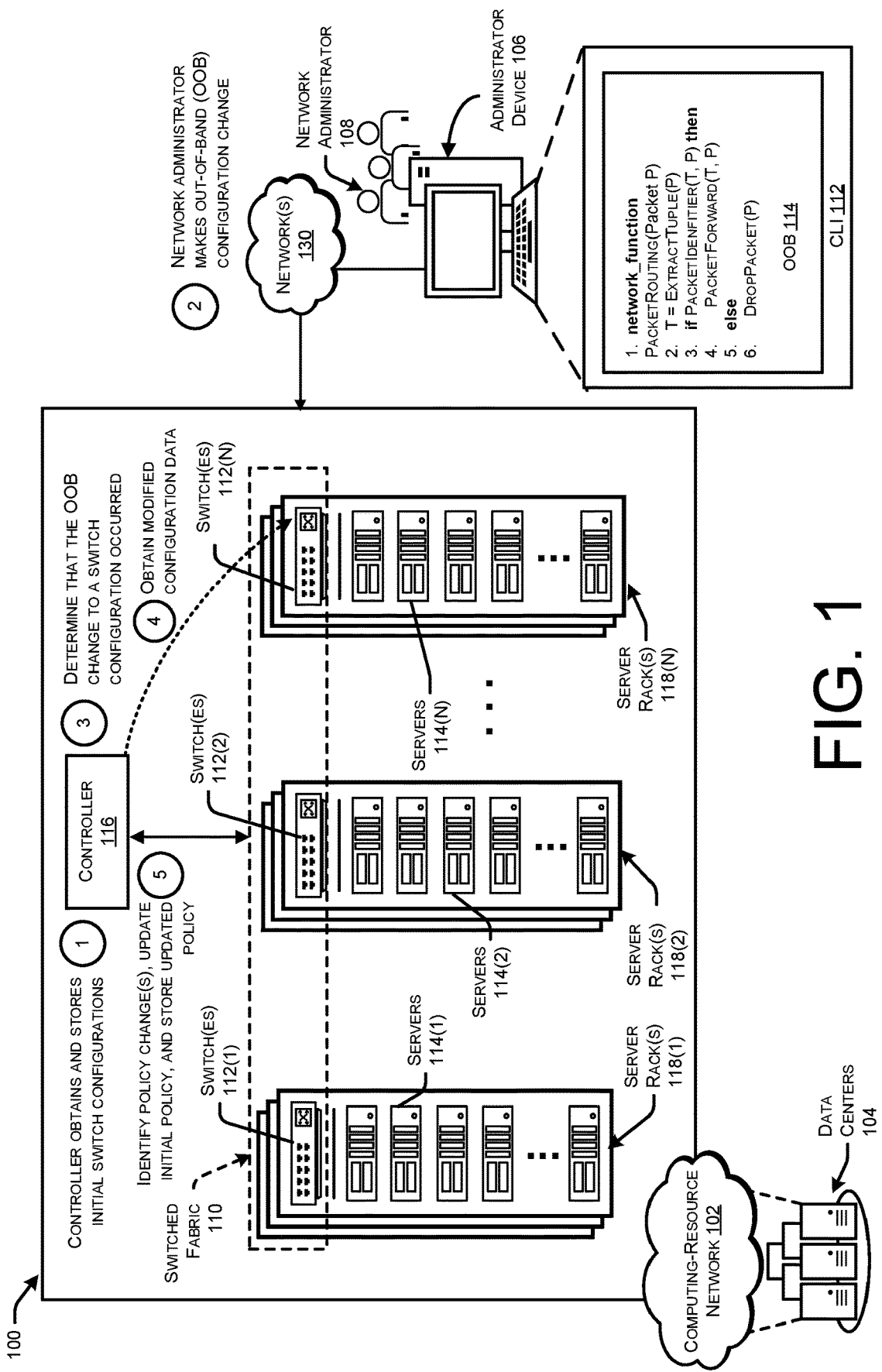
FIG. 1 illustrates a system diagram of an example architecture for detecting configuration changes in the configuration of network devices and synchronizing the network devices to the network.

The disclosure describes a method for detecting configuration changes in the configuration of network devices (e.g., fabric), and synchronizing the configuration of the network devices (e.g., fabric) to a controller device that manages the network devices in the network. The controller device may generate an initial policy for managing the network devices. The method may include, by the controller, identifying the network devices that their configuration has occurred to result in change due to Out-Of-Band (OOB) configuration changes. Further, the method may include obtaining the configuration data from the network devices, and update the initial policy of the network devices based on the obtained data. If the obtained data determines that the configuration of a network device has changed, the controller may report an error to the network. Otherwise, the controller may manage to update the configuration of the network device that its configuration has been changed. Finally, the updated policy may be stored at the controller.

Additionally, the techniques described herein may be performed by a system and/or device having non-transitory computer-readable media storing computer-executable instructions that, when executed by one or more processors, performs the method described above.

EXAMPLE EMBODIMENTS

Today, most network deployments are brownfield. In a brownfield deployment, the new software and hardware architecture may consider and coexist with the existing hardware and software already in situ. In a Software-Defined Network (SDN) (e.g., brownfield, greenfield deployments), the network is built around a network controller thus enabling the controller to learn the network architecture and device configurations, and integrate the knowledge in a way that enables to provide a centralized, programmable point of automation to manage, configure, monitor, and troubleshoot network devices. Using a controller in a structured approach for managing the network devices in a brownfield deployment to manage the network devices is a desirable approach to automate, monitor and troubleshoot the network. The present disclosure describes techniques for a structured automation approach for managing existing network devices based on a mechanism for learning the intent associated with configuration state of the network devices and modeling the learnt behavior at the controller. The techniques described herein include a process to determine the deviation between the configuration state of the controller, and the inferred configuration state of a network device, and modify the configuration state of the network device such that the network device configuration is synchronized with the controller. This approach allows to automate tedious task of (i.e., performed by a network administrator) of manually looking at the network device configuration, and creating appropriate configuration models. Thus, facilitating the network deployment in brownfield environment. For instance, a fabric can be easily added or grow and automatically configured. Updated policies and rules may also be required by the controller for facilitating any future modification to the configuration of the network devices.

A common mechanism for interacting with network devices (e.g., fabric), and implementing configuration changes is the Command Line Interface (CLI). CLI provides a concise format for viewing as well as changing a device configuration. Most automation tools are built to achieve configuration management and automation models that may eventually be translated to CLI commands either directly or indirectly. While customers may employ controllers for day bring-up and configuration updates, the network administrators may want the ability to make configuration changes directly on the fabric without necessary going through controller. For instance, the network administrator may use CLI for troubleshooting or maintaining the network. Further, when the configuration of network devices is modified via CLI, it may create Out-Of-Band (OOB) changes. The OOB configuration changes may cause issues with the controller compliance engine that detect and fix the changes. Therefore, the controller may synchronize the configuration state of the device with controller configuration state.

In some examples, the techniques describe herein includes determining the OOB changes in the network devices (e.g., fabric). In some examples, the controller may detect deviation between the network devices configuration state and the controller configuration state to determine OOB changes in the device configuration. When the OOB changes has occurred in the configuration of a network device, the device configuration is out of synchronization state. To return the device configuration state to synchronization state, the controller may need to resynchronize the device's configuration stored in the controller to match the device configuration. In some scenarios, when the network administrator may try to make ad-hoc configuration changes, the controller may avoid it. In some examples, the controller may allow ad-hoc configuration changes by the network administrator if a genuine case of OOB changes is identified.

In some examples, once the OOB configurations changes have been identified, the controller administrator may trigger the re-synchronization process. The re-synchronization process may include identifying the specific network devices whose configuration states have been changed. The re-synchronization process may identify the context of OOB changes by modeling configuration changes at the controller (e.g., pattern recognition algorithms). Since the controller is aware of the network devices CLI hierarchy structure, to identify OOB changes, the controller may perform a pattern recognition algorithm to search and find the best pattern matched to it its data model. For example, the Longest Prefix Matching (LPM), may be used to generate and detect the configuration deviation between the controller devices and controller data model.

Once the OOB configuration changes are determined, the controller may obtain the current configuration data of the network device, and may perform a series of pattern matching algorithm to map the configurations into policies. Later, the controller may perform another series of algorithms to reconcile these policies with the existing policies to determine the policy configuration deviations. The controller may update the policies, and may notify the updated policies to the network devices based on the policy configuration deviations. This process may include a review process to allow the network administrator to review, and rectifies the errors. Once the errors are rectified, the controller may perform a compliance check to verify that network devices (those that had OOB configuration changes) configuration and controller policies are synchronized.

Additionally, the techniques described herein may be used to track OOB configuration changes, and synchronizes the network devices to the controller inter dynamically. For instance, every time the OOB configuration changes are detected in the network devices, the controller may re-learn the network devices configuration, and repeat the process described above to synchronize the network devices to the controller intent.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example architecture 100 for detecting configuration changes in the configuration of network devices and synchronizing the network devices to the network. System architecture 100 includes a network architecture 102 that may include one or more data centers 104, and in which network administrators 108 of administrator devices 106 utilize a domain-specific language to express and compile serverless network functions to perform network operations. FIG. 1 further illustrates a network controller 116 in the network architecture 102 deploying the serverless network function at an optimal location (e.g., on an optimal network component or device) in the network architecture 102.

In some examples, the network architecture 102 may include devices housed or located in one or more data centers 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more data centers 104 may be physical facilities or buildings located across geographic areas that designated to store networked devices that are part of the network architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the packet-forwarding networks 102 may not be located in explicitly defined data centers 104, but may be located in other locations or buildings.

The administrator device 108 may establish communication connections over one or more networks 130 to communicate with devices in the network architecture 102, such as a network controller 116 of the network architecture 102. The network(s) 130 may include any viable communication technology, such as wired and/or wireless modalities and/or technologies. Networks 130 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The user administrator device 106 may communicate using any type of protocol over the network 130, such as the transmission control protocol/Internet protocol (TCP/IP) that is used to govern connects to and over the Internet.

The switch fabric (Fabric) 110 may include one or more switches 112(1)-112(N) housed or located in one or more sever racks 118(1)-118(N) respectively. The fabric 110 my interconnect nodes in the network 130 to nodes in the network 102. The fabric 110 may be implemented in hardware and software, and may move the IP packet from the network 130 to the network 102 or vice versa. The fabric 110 may use of a shared memory (e.g., RAM), and data buffers shared among different switches 112(1)-112(N). The fabric 1100 may include a device deployable configuration including fabric switch parameterized elements (variables) and control logic statements. The fabric configuration may define the fabric functionality, and enables to move the data packet between the different nodes of the network 130 and 102. In some examples, the fabric configuration may be configured via CLI 112 by network administrators 108. In some examples, the fabric configuration may be configured by controller 118.

The servers 114(1)-114(N) housed or located in one or more sever racks 118(1)-118(N) manage access to the network 102. In some example, the server 114(1)-114(N) may be database servers, file servers, mail servers, print servers, web servers, game servers, and application servers. The servers 114(1)-114(N) may provide functionality for the users and devices in the network 102 and 130. In addition, the servers 114(1)-114(N) may provide shared services such as sharing data or resources among multiple users of the network 10, 102, or performing computation for a user.

At "1," the network controller 116 may obtains configuration data from the switches 112(1)-112(N). Once the controller 116 obtained the configuration data, it may define a set of initial polices for the switches 112(1)-112(N). The controller 116 may store the set of initial policies at the fabric 110. The set of initial policies may define the fabric functionality. For instance, the initial policies may control the operation underlying fabric 110 including settings on hardware, protocols, network services, IP packet transportation, etc.

An initial policy is conventionally utilized to generate and replicate a device deployable configuration by replacing the parameterized elements (variables) with actual values and evaluating the control logic statements. As such an initial policy may include a configuration template which may include the Variables section which contains one or more declared variables, along with the associated data types, default values, and one or more valid value conditions for the variable parameters that are used for configuring the switches. These declared variables may be used for value substitution in the configuration during the execution of initial policy.

Network controllers such as Application Policy Infrastructure Controller (APIC), Data Network Automation Center (DNAC), Data Center Network Manager (DCNM), etc. have facilitated fabric provisioning, compliance, management and all operations. As such the controller may perform a device configuration at the controller intent initially to certify initial policies functionality, and then may have it rendered at the network device.

However, as illustrated at "2," the administrator devices may include a Command Line Interface 112 that is configured to receive inputs using the CLI 112 to express an OOB configuration changes 114 modified by the network administrator 108. As illustrated, the CLI 112 may receive, portion of source code, which is simply be illustrated as pseudocode, representing an example an Out-Of-Band (OOB) configuration change expressed by the network administrator 108. The administrator 108 may express an OOB configuration change using text input, graphical icons, and/or a combination thereof. In some instances, all of the source code representing the OOB changes may be expressed using the CLI. The CLI may represent an interface to OOB configuration changes in the network devices. As such, a deviation may occur between the controller intent and the device configuration state.

At "3," the controller 116 may determine that OOB configuration changes to one or more of the switches 112(1)-112(N) occurred. In some example, once the controller determined that a configuration change occurred in a switch, the controller may trigger to do a synchronization process as described herein in more detail below. It is worth to mention that the controller may avoid network administrator 108 from making ad-hoc OOB changes directly to the network devices.

At "4," the controller 116 may obtain modified configuration data from the switches 112(1)-112(N). Once the controller obtained the modified configuration data, it may perform a series of pattern matching algorithm to map the configurations into policies. Later, the controller may perform another series of algorithms to reconcile these policies with the initial policies to determine the policy configuration deviations. If an error occurs in reconciliation process for a switch, the controller may reject the synchronization process for the switch, and report the error to the network administrators 108.

At "5," the controller 116 may update the policies and store the policies in the fabric 110. The controller 116 may perform a compliance check to verify switches configurations and controller policies are synchronized. The controller may perform steps "1"-"5" repeatedly to track OOB configuration changes, and synchronizes the network devices to the controller intent.

In order to identify the OOB changes 114, the controller 116 may perform a pattern search and match algorithm to find the best configuration pattern that matches the configuration at the switch that its configuration has changed. The pattern search and match algorithm may be part of controller data model. In some example the pattern search and match algorithm may be a Longest Prefix Mach (LPM) algorithm. The LPM may find the best match from as set of templates stores in a look-up able.

On approach to implement to deploy configuration across the network devices may be to use CLI configuration templates (e.g., structured templates, sub template). The use of templates provides a customizable way for a user to reproducibly configure the network devices in a very efficient and concise way. CLI templates are a set of re-usable device configuration commands with the ability to parameterize select elements of the configuration as well as add control logic statements. Such (CLI) configuration template may be used by, for example, controller 116, to generate a device deployable configuration by replacing the parameterized elements (variables) with actual values and evaluating the control logic statements.

Sub-templates may be regarded as a parts of configuration blocks, each of which matches an aspect of a device running configuration. A controller may generate general configuration statements from a configuration template in order to match the current running configuration of a device. The template generated configuration expressions may then be used as masks to identify matching configuration patterns in the device running configuration. When a portion of a device running configuration matching a specific sub template-generated configuration expression is found, the controller service may extract relevant network-related parameter values and other key information from the relevant portion of the device running configuration. The extracted information from different sub-templates may then be checked against fabric policies and operation standards for consistency per entities (e.g., interface, routing blocks, AAA config blocks, etc.). The extracted information from the sub-templates may be integrated to generate a CLI output format that matched running configuration of the device.

It is appreciated that the synchronizing the network devices that configurations have occurred to change due to OOB option, can be performed across a group of network devices similar (in some sense) which belongs to a logical cluster. For instance, the process described above can be applied across multiple network devices that share a common need such as Virtual Private Cloud (vPC), port-channel, etc. In some examples, when VPC is used to provide a shared resource across multiple network devices, the process described above may detect and accurately match pairwise switch configuration changes associated with the vPC domain such as vPCs, active/active Fabric Extender (FEX), etc.

In some examples, the process described above may be implemented by hardware and software agnostic model, where reliance on hardware or a specific platform is not required. A hardware-agnostic system may not require any modifications to run on a a variety of network devices. Thus, hardware agnostic design brings about a high level of compatibility across most common network devices which is suitable for a brownfield environment.

A common mechanism for modeling the configuration states of network devices at the controller is a tree-like configuration structure. In a tree-like configuration structure, the configuration hierarchy is represented by an extensible tree diagram consisting of elements such as root node, a member that has np superior/parent, and nodes which are linked together with lines connections called branch that represent the relationships and connections between members. In a tree-like configuration hierarchy, each node may represent an aspect of the device running configurations. In some examples, the tree-like models to model configuration of network devices may include NX-OS, IOS-XR, IOS-XE, and Arista EOS.

In some examples, the process described above may be implemented by feature agnostic data models, where the data transmission format is irrelevant to the network devices transmit or receive IP packets. For instance, the switches configurations are unaware of network topologies connecting the network devices to the networks 102, 130. The network topologies may include Virtual Extensible Local Area Network (VXLAN), Ethernet Virtual Private Network (EVPN), Border Gateway Protocol (BGP), Massively Scalable Data Center (MSDC), Segment Routing (SR), etc. In feature agnostic approach, the data modeling algorithm for configuring controller intent may include larger intent engine to be consistent with the topology awareness and feature awareness.

Figure 2:
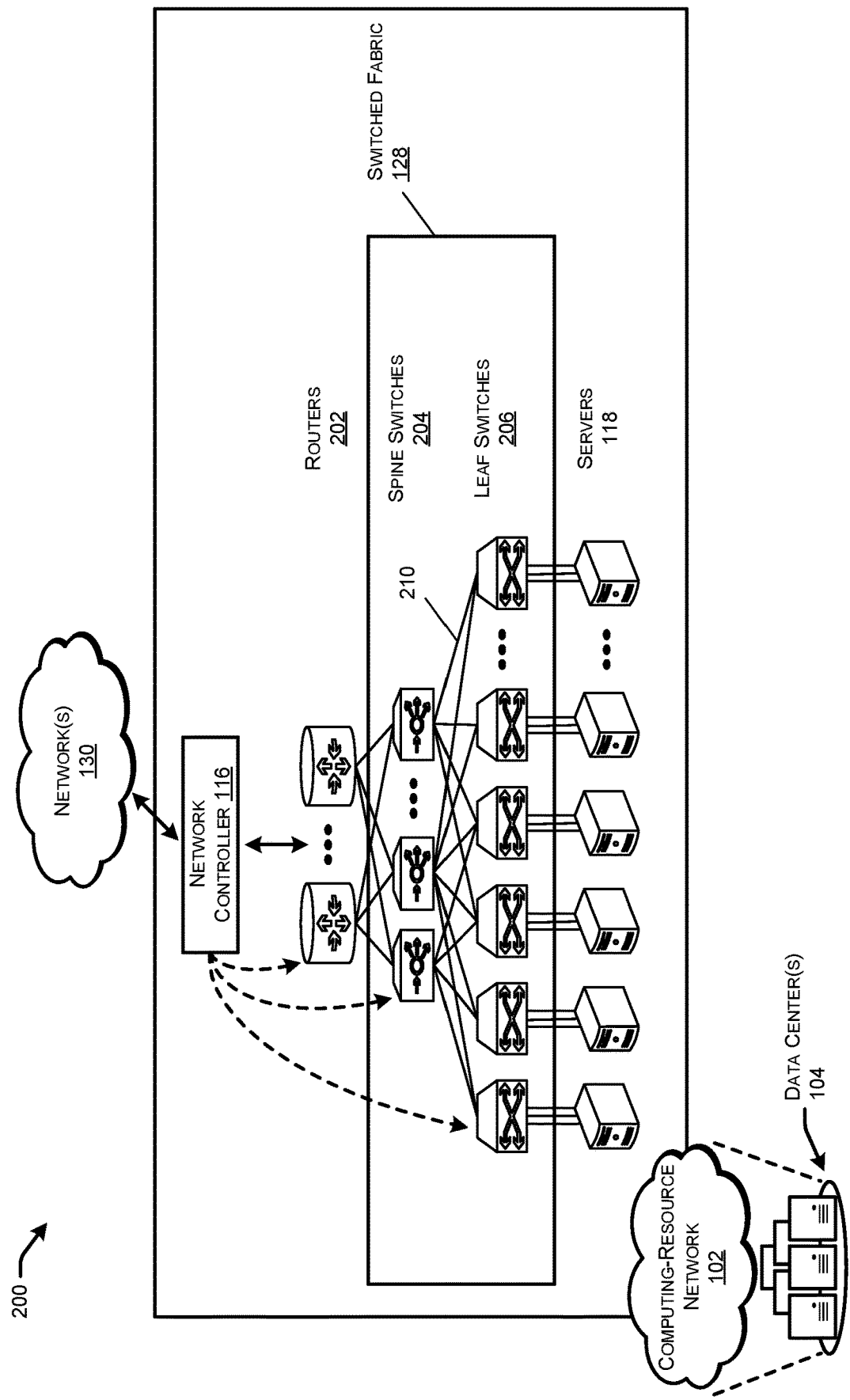
FIG. 2 illustrates a system diagram of network architecture of a multi-plane network having a spine-leaf switch fabric structure.

FIG. 2 illustrates a simple network architecture of a multi-plane network 102 including switch fabric 128, routers 202, and network controller 116. The fabric switch 128 a spine-leaf switch fabric structure that includes nodes in a spine layer 204 (e.g., spine nodes 112, top of fabric (ToF) nodes, super spine nodes, etc.), and nodes in a leaf layer 206 (e.g., leaf nodes 118). Nodes in the different layers may be communicatively coupled to each other through connections 210, which generally represent connectivity and not actual physical links. Generally, one or more network prefixes can be associated with each of the leaf nodes 206 such as network prefixes. Some, or all, of the nodes in each of the layers may be switches and be included a switched data-center fabric, such as a leaf-spine network topology, fat-tree network topology, Clos network topology, and so forth.

As noted above, the leaf nodes 206 may be connected to servers that are hosting applications, but the leaf nodes may additionally, or alternatively, be connected to other types of devices that send traffic through the multi-plane network 102 for various reasons. For instance, the leaf nodes 206 may be connected to, and send traffic through the network 102 on behalf of, devices (or "endpoints") such as general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints can also include Internet of Things (IoT) devices or equipment, such as agricultural equipment, connected cars and other vehicles, smart home sensors and devices (e.g., alarm systems, security cameras, lighting, appliances, media players, HVAC equipment, utility meters, windows, automatic doors, door bells, locks, etc.), healthcare devices (e.g., pacemakers, biometric sensors, medical equipment, etc.), industrial equipment (e.g., robots, factory machinery, construction equipment, industrial sensors, etc.), retail equipment (e.g., vending machines, point of sale (POS) devices, Radio Frequency Identification (RFID) tags, etc.), smart city devices (e.g., street lamps, parking meters, waste management sensors, etc.), and so forth.

The multi-plane network 102 is illustrated as a simple spine-leaf network with switches, but this is merely for illustrative purposes. The multi-plane network 102 may include different numbers and/or types of endpoints, nodes, cloud components, servers, software components, devices, virtual or physical resources, configurations, topologies, services, appliances, or deployments are also contemplated herein. Further, the multi-plane network 102 can include any number or type of resources, which can be accessed and utilized by endpoints or network devices. The illustrations and examples provided herein are for clarity and simplicity.

Figure 3:
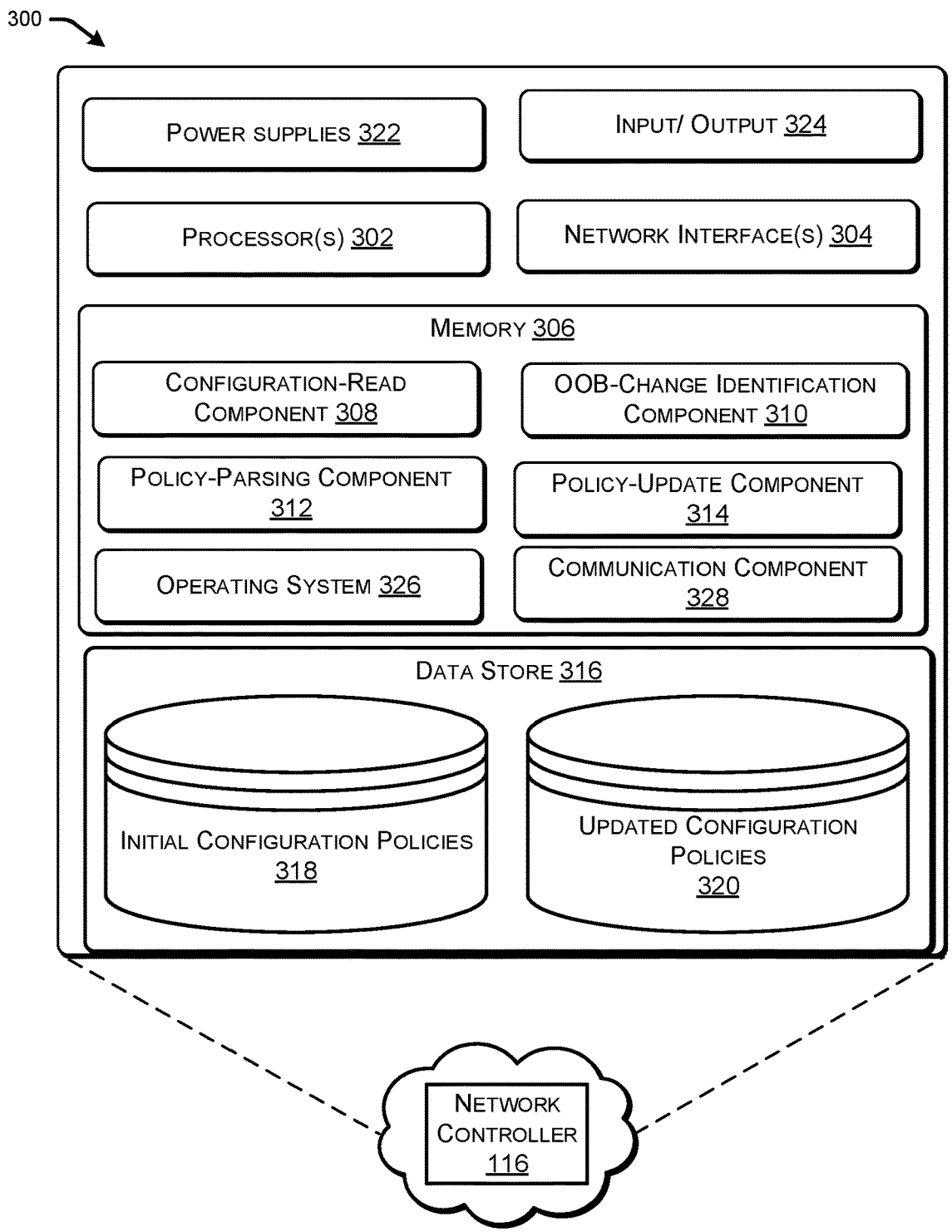
FIG. 3 illustrates a component diagram of an example an example network controller that can be utilized to implement aspects of the technologies disclosed herein.

FIG. 3 illustrates a component diagram of an example an example network controller 116 that can be utilized to implement aspects the technologies disclosed herein. The controller 116 may be any type of computing device capable of receiving expressions of fabric configuration parameterization via a CLI interface 112 and sending data the network 130 via a suitable data communications network device such as, but not limited to, a laptop or desktop computer, a tablet computing device, a server computer, a television, or a mobile telephone.

As illustrated, the controller 116 may include one or more hardware processors 302 (processors), one or more devices, configured to execute one or more stored instructions. The processor(s) 302 may comprise one or more cores. Further, the controller 116 may include one or more network interfaces 304 configured to provide communications between the fabric 110 and/or other systems or devices in the network architecture 102 and/or remote from the network architecture 102. The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi, and so forth.

The controller 116 can include one or more power supplies 322, such as one or more batteries, connections to mains power, etc. The controller 116 can also include one or more inputs and outputs 324 for receiving and processing input from a number of input devices, such as a keyboard, a mouse, a touchpad, a touch screen, an electronic stylus, or other type of input device. Further, the input/outputs 324 can include a display, such as a computer monitor, a flat-panel display, a digital projector, a printer, or other type of output device. It will be appreciated that the user device controller 116 might not include all of the components shown in FIG. 3, can include other components that are not explicitly shown in FIG. 3, or might utilize an architecture completely different than that shown in FIG. 3.

The controller 116 may also include memory 306, such as computer-readable media, that stores various executable components (e.g., software-based components, firmware-based components, etc.). The memory 306 may generally store components to implement functionality described herein. The memory 306 may store an operating system 318 utilized to control the operation of components of the controller 116. Further, the memory 306 may store a communication component 328 that comprises software (e.g., any protocol stack) to enable the controller 116 to communicate with other devices using the network interface 304.

In some examples, the memory 306 may store a configuration-read component configured to enable the controller device 116 to obtain the fabric configurations data. The fabric configuration data may include configuration data of switches 112(1)-112(N) representing the switches functionality such as hardware settings, protocols, network service, accessibility, port configuration, etc. Additionally, the configuration data of each switch may represent the policies and rules of the switches. The read component may comprise a human readable code or binary machine code, when executed on the processor 302, may enable the controller 116 to access switches configuration, and obtain the switches configurations data via the network interface 304.

In some examples, the memory 306 may store an OOB-identification component 310 configured to enable the controller 316 to identify if OOB configuration changes occurred in the configurations of the switches 112(1)-112(N). The OOB-identification component comprises a human readable code or binary machine code, when executed on the processor 302, may enable the controller 116 to identify OOB configuration changes in the configuration of the switches 112(1)-112(N).

In some examples, the memory 306 may store a policy-parsing component 312 configured to infer the initial configuration policies from the data obtained from the switches 112(1)-112(N) configurations. The policy-parsing component may comprise a human readable code or binary machine code, when executed on the processor 302, may enable the controller 116 to infer policies from the obtained data from the switches configuration, such as switches 112(1)-112(N). The initial policies may a set of rules specifying switches accessibility, hardware settings, interface characteristic, monitoring and troubleshooting, load balancing, port routing, etc.

In some example, the memory 306 may store a policy-update component 328 configured to create new policies from the data obtained from the switches 112(1)-112(N) configurations. The policy-update component may comprise a human readable code or binary machine code, when executed on the processor 302, may enable the controller 116 to create new policies from the obtained data from the switches configuration, such as switches 112(1)-112(N). The policy-update component 116 may reconcile the new policies with initial policies to assure that the new policies are consistent with the initial policies. If the new policies are not consistent with the initial policies, the policy-update component 116 may indicate the controller 116 to report an error to the network 102. Otherwise, the policy-update component may indicate the controller 116 to update policies of those switches that had OOB configuration changes.

The controller 116 may further include a data store 316, which may comprise any type of computer memory including long-term memory (e.g., Read Only Memory (ROM), Random Access Memory (RAM), caches, etc.). The data store 316 may include an initial configuration policy 318 that includes a set of rules underlying fabric 110 such as settings on hardware, protocols and network services, initially configured at the controller. Further, the data store 316 may include an updated configuration policy 320, that includes a modified set of initial policies due to changes in the network configuration.

Figure 4:
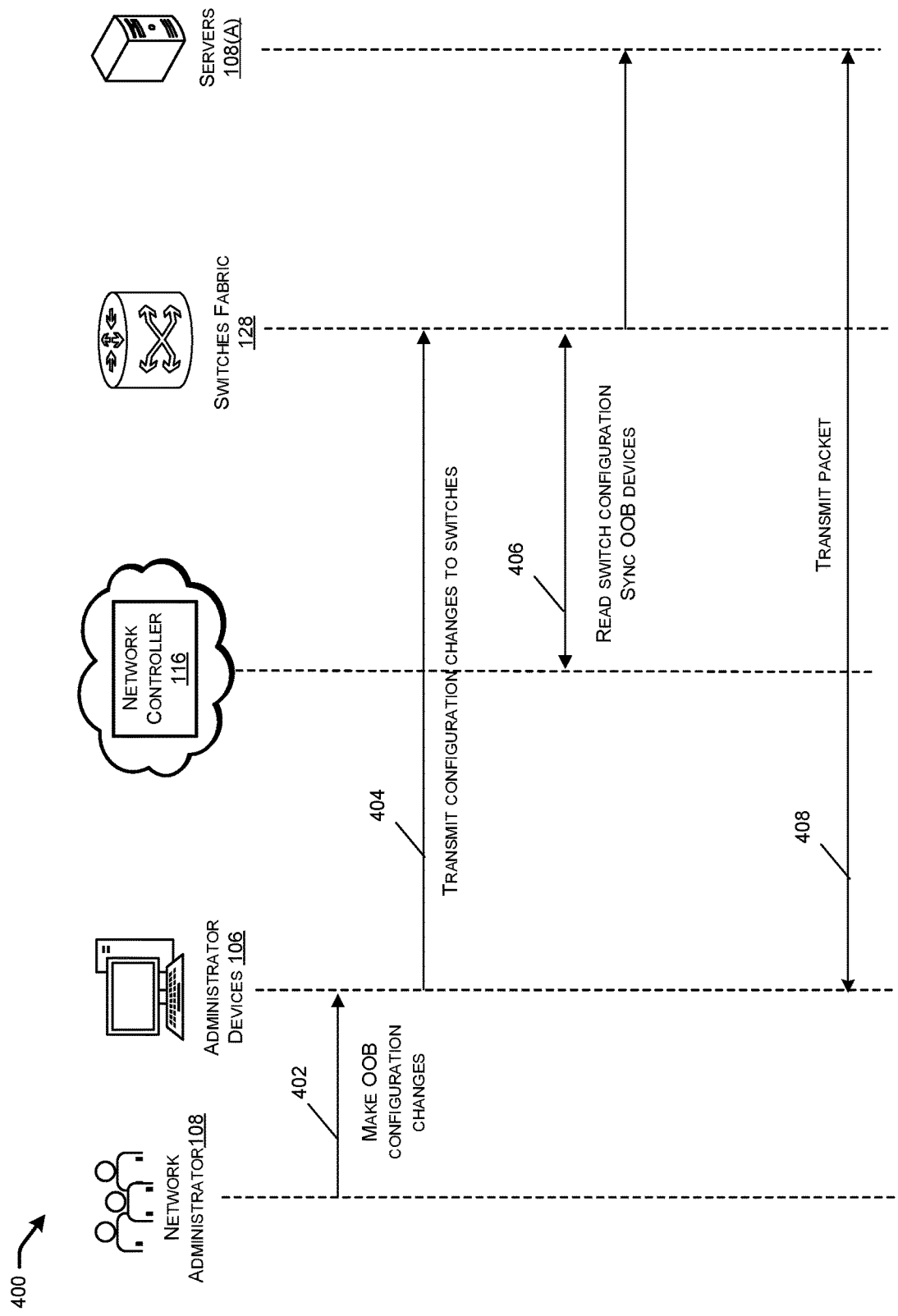
FIG. 4 illustrates a flow diagram of an example method for identifying Out-Of-Band (OOB) configuration changes in network devices, and synchronizing the network devices to the controller intent.

FIG. 4 illustrates a flow diagram of an example method 400 for identifying OOB configuration changes in network devices, and synchronizing network devices to the controller intent. Additionally, FIG. 4 illustrate communication flow between the network devices according to some aspect of described herein.

At step 402, a network administrator may modify the configuration of a switch in switch fabric 128 directly, unknown to the controller 116. The network administrator may use CLI to interface with administrator device 106, to modify parameters and variables in the configurations of the network devices for executing specific network functions.

At step 404, the administrator device 106, may transmit the modified configuration changes by the network administrator to the switch fabric 228. Accordingly, the switch fabric may apply the configuration changes to the switch via the network 130.

At step 406, the controller 116, may read switched fabric configurations. The controller 116 may determine whether the switch configuration is different than the controller intent. If the controller intent is different that the controller intent, the controller 116 may indicate the OOB configuration change has occurred in the switch. If the controller determines that OOB configuration change has occurred in the switch, the controller may update the polices of the switched fabric based on the deviation between the switch state and the controller intent, and synchronize the switch to the network.

At step 408, once the controller verifies that the switched fabric is synchronized to the network, the administrator device may transmit an IP packet to the servers 108 via fabric switches 128.

Figure 5:
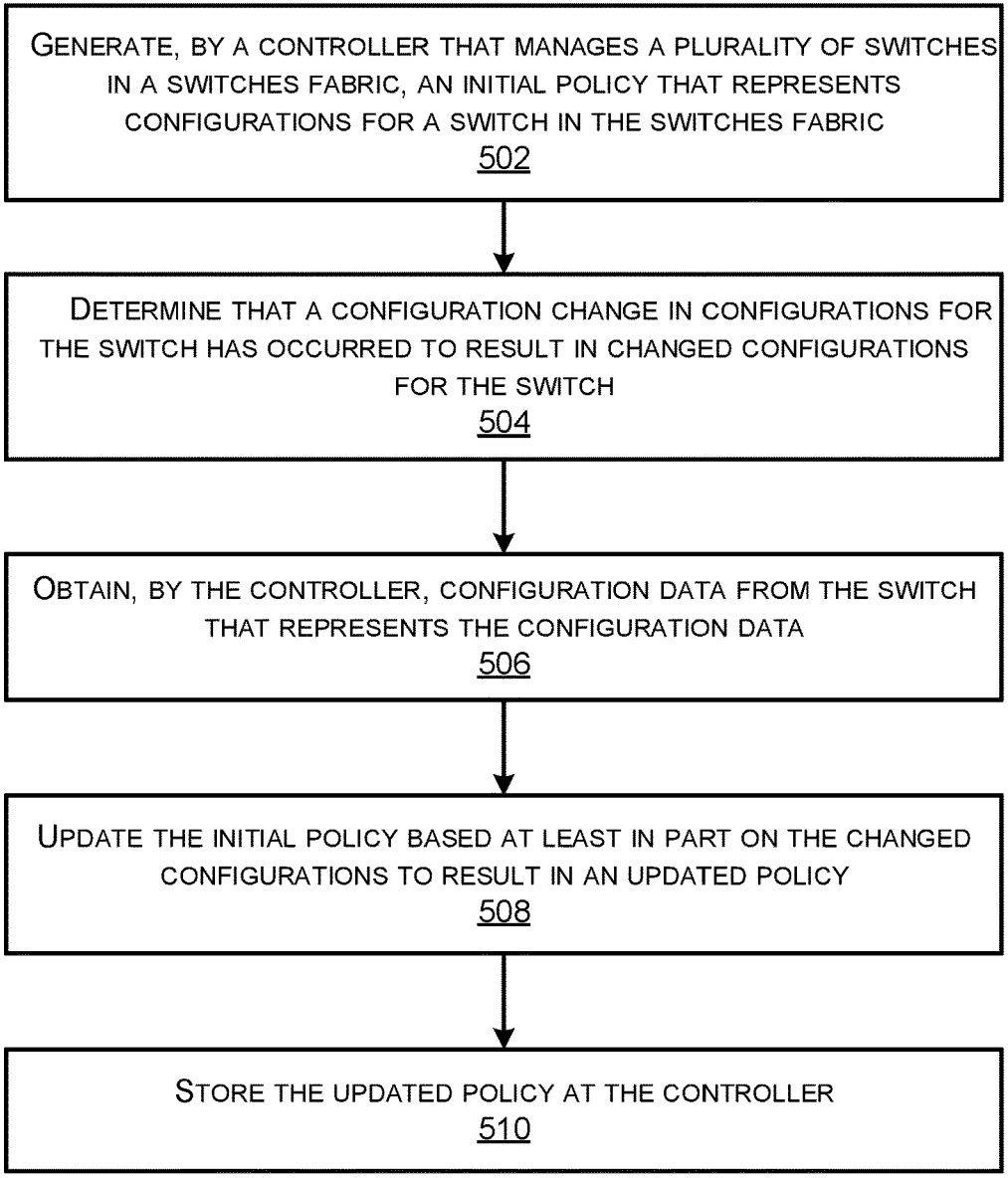
FIG. 5 illustrates a flow diagram of an example method for a network controller component to determine configuration changes in the configuration of the network devices and update configuration of the network devices.

FIG. 5 illustrates a flow diagram of an example method for a network controller component to determine configuration changes in the configuration of the network devices and update configuration of the network devices.

At step 502, a controller of a network that manage a plurality of switches in switched fabric create an initial policy that represents configuration for a switch in the switched fabric. The controller may generate the initial policies according to switched fabric infrastructure, operation and functionality, and network protocols. Additionally, the controller may deploy a code that represent the switch policy. The controller may use the code to the configure the switches.

At step 504, the controller may determine that a configuration change in configurations of the switch has occurred to result in changed configurations for the switch. The controller may run a pattern recognition algorithm to detect if the switch configuration state is deviated from the controller state. The pattern recognition algorithm may perform a search to find configuration matches between the switch configuration state and the controller intent.

At step 506, the controller may obtain the configuration data that represents the switch configuration from the switch. The controller may run a pattern recognition algorithm to parse the obtained data from the switch. Based on the data, the controller may decide to modify the initial polices of the switch. The controller may perform a compliance check to verify that modified policies are consistent with the initial policies. If the modified and initial policies are consistent, the controller may synchronize the switch configuration to the controller state.

At step 510, the controller may update the controller policies, and store the modified polices.

Figure 6:
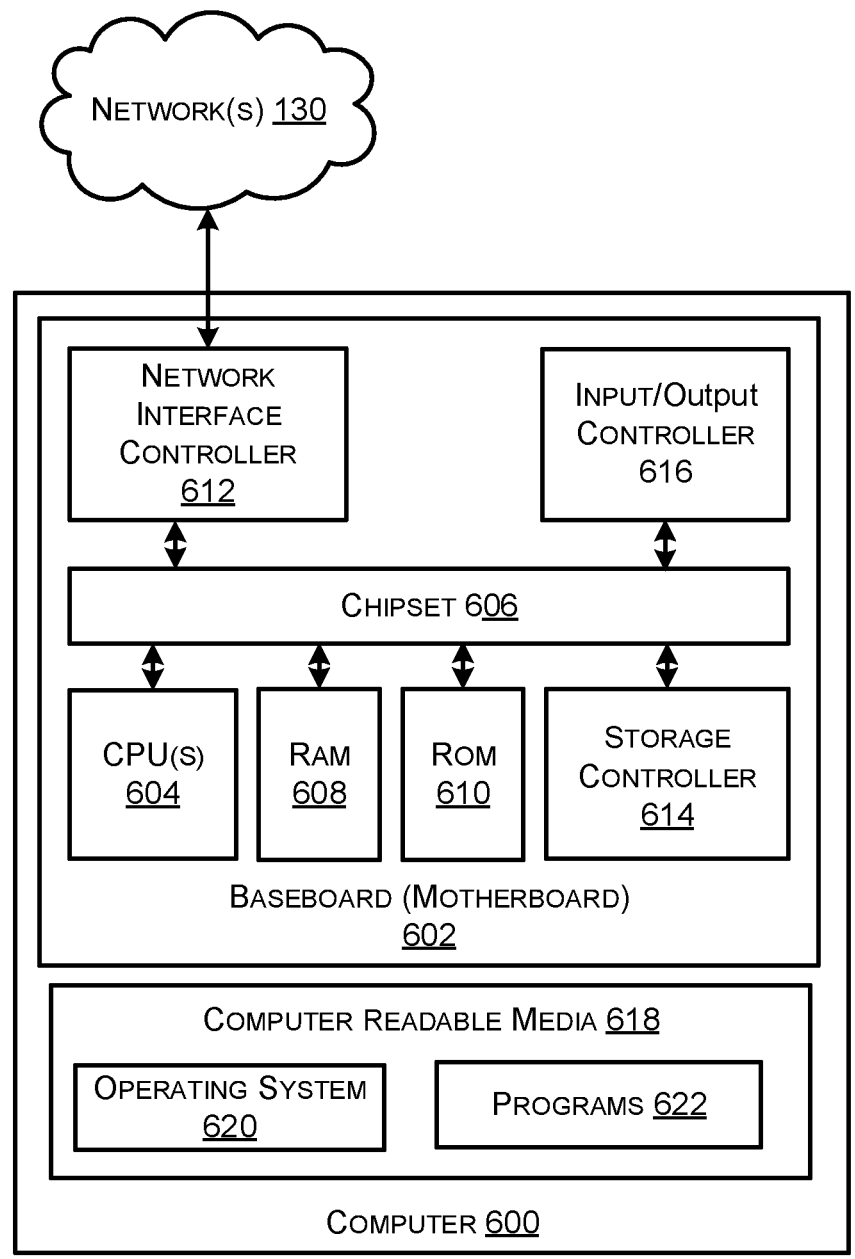
FIG. 6 is a computer architecture diagram showing an illustrative computer hardware architecture for implementing a computing device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to a network controller 116, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 1304 and the remainder of the components and devices on the baseboard 602. The chipset 606 can provide an interface to a RAM 1308, used as the main memory in the computer 1300. The chipset 1306 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 130. The chipset 606 can include functionality for providing network connectivity through a NIC 612, such as a gigabit Ethernet adapter. The NIC 612 is capable of connecting the computer 600 to other computing devices over the network 130. It should be appreciated that multiple NICs 612 can be present in the computer 600, connecting the computer to other types of networks and remote computer systems.

The computer 600 can be connected to a storage device 1618 that provides non-volatile storage for the computer. The storage device 1318 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1318 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the administrator device 106, network controller 116, and or any components included therein, may be supported by one or more devices similar to computer 600. Stated otherwise, some or all of the operations performed by administrator device 106 and/or network controller 116, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 1300.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 1304 transition between states, as described above. According to one embodiment, the computer 600 has access to computer-readable storage media storing computer-executable instructions which, when executed by the computer 600, perform the various processes described above with regard to FIGS. 1-6. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIGS. 1-3, can include other components that are not explicitly shown in FIG. 6, or might utilize an architecture completely different than that shown in FIG. 6.

As described herein, the computer 600 may comprise one or more of a administrator device 106, a network controller 116, and/or any other device. The computer 600 may include one or more hardware processors 604 (processors) configured to execute one or more stored instructions. The processor(s) 1304 may comprise one or more cores. Further, the computer 600 may include one or more network interfaces configured to provide communications between the computer 600 and other devices, such as the communications described herein as being performed by the administrator device 106 or network controller 116. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for configuring switched fabric using a CLI and/or deploying switched fabric in brownfield network environment.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   obtaining, by a controller that manages a plurality of switches in a switch fabric, first configuration data from the plurality of switches;
   generating, by the controller and based on the first configuration data, an initial policy that represents a fabric intent usable by the controller to manage the plurality of switches in the switch fabric;
   detecting that an out-of-band (OOB) configuration change in configurations for a switch of the plurality of switches in the switch fabric has occurred to result in changed configurations for the switch;
   obtaining, by the controller, second configuration data from the switch that represents the changed configurations;
   creating, using the changed configurations and a pattern matching algorithm, a modified policy usable by the controller to manage the plurality of switches in the switch fabric;
   determining that the fabric intent is maintained by reconciling the initial policy and the modified policy;
   updating the initial policy based at least in part on the modified policy to result in an updated policy; and
   storing the updated policy at the controller.

2. The method of claim 1, further comprising:
   reconciling the updated policy with existing policies for the plurality of switches in the switch fabric.

3. The method of claim 2, further comprising:
   verifying that the updated policy is consistent with the existing policies for the plurality of switches in the switch fabric.

4. The method of claim 1, further comprising:
   performing a compliance check process to ensure that a configuration of the switch and controller policies are in-synch.

5. The method of claim 1, further comprising:
   determining that an error occurred based at least in part on the changed configurations being out of sync with the initial policy.

6. The method of claim 5, further comprising:
   reporting an error message to a network administrator device in response to determining that the error occurred.

7. The method of claim 1, wherein the switch fabric is included in a set of network switches to which the OOB configuration change was made.

8. The method of claim 1, wherein detecting the OOB configuration change is performed by the controller.

9. A system comprising:
   one or more processors; and
   one or more non-transitory computer-readable media storing computer-executable instructions that, when executed by the one or more processors, cause the one or more processors to:
   generate, by a controller that manages a plurality of switches in a switch fabric, an initial policy that represents a fabric intent usable by the controller to manage the plurality of switches in the switch fabric;
   detect that an out-of-band (OOB) configuration change in configurations for a switch of the plurality of switches in the switch fabric has occurred to result in changed configurations for the switch;
   obtain, by the controller, configuration data from the switch that represents the changed configurations;
   create, using the changed configurations and a pattern matching algorithm, a modified policy usable by the controller to manage the plurality of switches in the switch fabric;
   determine that the fabric intent is maintained by reconciling the initial policy and the modified policy; and
   update the initial policy based at least in part on the modified policy to result in an updated policy.

10. The system of claim 9, wherein the computer-executable instructions further cause the one or more processors to:
    reconcile the updated policy with existing policies for the plurality of switches in the switch fabric.

11. The system of claim 10, wherein the computer-executable instructions further cause the one or more processors to:
    verify that the updated policy is consistent with the existing policies for the plurality of switches in the switch fabric.

12. The system of claim 9, wherein the computer-executable instructions further cause the one or more processors to:
    perform a compliance check process to ensure that a configuration of the switch and controller policies are synchronized.

13. The system of claim 9, wherein the computer-executable instructions further cause the one or more processors to:
    determine that an error occurred based at least in part on the changed configurations being out of sync with the initial policy.

14. The system of claim 13, wherein the computer-executable instructions further cause the one or more processors to:
    reporting an error message to a network administrator device in response to determining that the error occurred.

15. The system of claim 9, wherein the switch fabric is included in a set of network switches to which the OOB configuration change was made.

16. The system of claim 9, wherein detecting to determine that the OOB configuration change is performed by the controller.

17. At least one non-transitory computer-readable storage medium having stored therein instructions which, when executed by one or more processors, cause the one or more processors to:
    obtain first a configuration data from a plurality of switches in a switch fabric;

generate, by a controller that manages the plurality of switches in the switch fabric and based on the first configuration data, an initial policy that represents a fabric intent usable by the controller to manage the plurality of switches in the switch fabric;

detect that an out-of-band (OOB) configuration change in configurations for a switch of the plurality of switches in the switch fabric has occurred to result in changed configurations for the switch;

obtain, by the controller, second configuration data from the switch that represents the changed configurations;

create, based at least in part on the changed configurations, a modified policy usable by the controller to manage the plurality of switches in the switch fabric;

determine that the fabric intent is maintained by reconciling the initial policy and the modified policy; and update the initial policy based at least in part on the modified policy to result in an updated policy.

18. The at least one non-transitory computer-readable storage medium of claim 17, wherein the instructions, when executed, further cause the one or more processors to:
reconcile the updated policy with existing policies for the plurality of switches in the switch fabric.

19. The at least one non-transitory computer-readable storage medium of claim 18, wherein the instructions, when executed, further cause the one or more processors to:
verify that the updated policy is consistent with the existing policies for the plurality of switches in the switch fabric.

20. The at least one non-transitory computer-readable storage medium of claim 17, wherein the instructions, when executed, further cause the one or more processors to:
perform a compliance check process to ensure that a configuration of the switch and controller policies are in-synch.

\* \* \* \* \*